United States Patent
Sorensen et al.

(10) Patent No.: US 12,074,352 B2
(45) Date of Patent: Aug. 27, 2024

(54) SYSTEM FOR REFUELLING A HEARING AID FUEL CELL

(71) Applicant: Widex A/S, Lynge (DK)

(72) Inventors: Per Kokholm Sorensen, Virum (DK); Boris Valnert, Frederikssund (DK); Thorvaldur Oli Bodvarsson, Copenhagen S (DK); Drew Rosskelly, Farum (DK); Michael Frydendal Larssen, Vekso (DK); Rune Aarup Due, Copenhagen S (DK)

(73) Assignee: Widex A/S, Lynge (DK)

( * ) Notice: Subject to any disclaimer, the term of this patent is extended or adjusted under 35 U.S.C. 154(b) by 567 days.

(21) Appl. No.: 17/295,515

(22) PCT Filed: Dec. 2, 2019

(86) PCT No.: PCT/EP2019/083272
§ 371 (c)(1),
(2) Date: May 20, 2021

(87) PCT Pub. No.: WO2020/114953
PCT Pub. Date: Jun. 11, 2020

(65) Prior Publication Data
US 2022/0006108 A1   Jan. 6, 2022

Related U.S. Application Data

(60) Provisional application No. 62/776,229, filed on Dec. 6, 2018.

(51) Int. Cl.
*H01M 8/04082* (2016.01)
*H01M 8/1011* (2016.01)

(52) U.S. Cl.
CPC ...... *H01M 8/04208* (2013.01); *H01M 8/1011* (2013.01)

(58) Field of Classification Search
CPC ..................... H01M 8/04201; H01M 8/04208
(Continued)

(56) References Cited

U.S. PATENT DOCUMENTS

2003/0009942 A1* 1/2003 Amendola ............. B01J 8/0278
48/61
2005/0023236 A1 2/2005 Adams et al.
(Continued)

FOREIGN PATENT DOCUMENTS

JP       2006-040769 A       2/2006

OTHER PUBLICATIONS

International Search Report for PCT/EP2019/083272 dated Mar. 9, 2020 PCT/ISA/210.
(Continued)

*Primary Examiner* — Pamela H Weiss
*Assistant Examiner* — John S Medley
(74) *Attorney, Agent, or Firm* — Sughrue Mion, PLLC

(57) ABSTRACT

A system and method for refuelling a fuel cell having a fuel reservoir. The system includes a cartridge (1) having a first reservoir (2) for storing fuel for the fuel cell and a refuelling unit adapted to receive a waste liquid from the fuel reservoir of the fuel cell and provide fuel from the first reservoir (2) of the cartridge (1) to the fuel reservoir of the fuel cell. The system further includes a second reservoir for storing the waste liquid from the fuel cell, a cartridge for use with the system, a refuelling unit for use with the system.

11 Claims, 4 Drawing Sheets

(58) Field of Classification Search
USPC .......................................................... 429/513
See application file for complete search history.

(56) References Cited

U.S. PATENT DOCUMENTS

| | | |
|---|---|---|
| 2005/0074643 A1 | 4/2005 | Adams et al. |
| 2005/0155668 A1* | 7/2005 | Finkelshtain ..... H01M 8/04186 |
| | | 141/67 |
| 2007/0087234 A1 | 4/2007 | Wang et al. |
| 2009/0226772 A1* | 9/2009 | Stark ................... H01M 8/0662 |
| | | 141/285 |
| 2017/0133694 A1* | 5/2017 | Risager ................ H04R 25/556 |
| 2017/0134868 A1* | 5/2017 | Rosskelly ......... H01M 8/04216 |

OTHER PUBLICATIONS

Written Opinion for PCT/EP2019/083272 dated Mar. 9, 2020 PCT/ISA/237.

* cited by examiner

SYSTEM FOR REFUELLING A HEARING AID FUEL CELL

CROSS REFERENCE TO RELATED APPLICATIONS

This is a National Stage of International Application No. PCT/EP2019/083272 filed Dec. 2, 2019, claiming priority based on U.S. Provisional Patent Application No. 62/776,229 filed Dec. 6, 2018.

FIELD

The present invention relates to a system for refuelling a fuel cell of a hearing aid, a cartridge for use with the system, a refuelling unit for use with the system, and a method of refuelling a fuel cell.

BACKGROUND

In recent years, technological development in inter alia transducers and signal processing has allowed hearing aids to become increasingly advanced whilst decreasing in size. However, the decreasing size and increasing advancement of hearing aids, make increased demands on the power source of the hearing aid. Most hearing aids use single-use batteries, such as Zinc Air batteries, or rechargeable nickel metal hybrid (NiMH) batteries as power sources.

Fuel cells, such as direct methanol fuel cells, may be used as an alternative power source for hearing aids. This requires a periodic refuelling of the fuel cell in the hearing aid, which advantageously takes less than one minute. To prevent the hearing aid from running out of power, refuelling is typically conducted, whilst some fuel is still left. This, in combination with potential fuel wastage, requires handling of waste containing methanol and by-products, which may be undesirable or inconvenient for the user to get into contact with, as well as storage thereof.

JP2006040769 discloses an apparatus for use with a fuel cell. The apparatus comprises a fuel chamber for storing fuel, which can be supplied to the fuel cell, and a recovery chamber for collecting exhaust gas and containing water for dissolving substances, i.e. by-products, in the exhaust gas. The recovery chamber moreover includes a gas-liquid separation membrane separating exhaust gas that has passed through the water, i.e. detoxified carbon dioxide, and a gas adsorption filter. The detoxified carbon dioxide is discharged to the outside through the gas adsorption filter, and the by-products such as methanol are recovered in the recovery chamber, which consequently expands due to the gas filling and pressure.

It, however, remains a problem to provide a system having a refuelling unit and a cartridge, capable of disposing of waste comprising fuel, such as methanol, and by-products.

SUMMARY

According to a first aspect, the present invention relates to a system for refuelling a fuel cell having a fuel reservoir, the system comprising
- a cartridge having a first reservoir for storing fuel for the fuel cell,
- a refuelling unit adapted to receive a waste liquid from the fuel reservoir of the fuel cell and provide fuel from the first reservoir of the cartridge to the fuel reservoir of the fuel cell, wherein the system further comprises a second reservoir for storing the waste liquid from the fuel cell, characterised in that the second reservoir comprises at least one evaporation opening connected to the surroundings, and adapted to allow the waste liquid to evaporate from the second reservoir to the surroundings.

By the second reservoir being configured to store the waste liquid from the fuel reservoir of the fuel cell and comprising at least one evaporation opening, waste liquid, which may contain fuel and/or by-products, is allowed to evaporate to the surroundings. This, in turn, minimises the need for long-term storage of waste liquid. The volume of waste liquid, allowed to evaporate from the second reservoir per time, may be limited, e.g. by the number and/or cross-sectional area of the at least one evaporation opening. Consequently, waste liquid may be disposed of in amounts, which impose minimal if any health risk to the user. Waste liquid refers throughout this text to the waste liquid from the fuel reservoir of the fuel cell and not to be understood as a residual product of the chemical process taking place across a membrane of the fuel cell. The waste liquid may typically be unused fuel. The system may be used with a direct methanol fuel cell (DMFC), and the fuel may thus be methanol.

In an embodiment, the refuelling unit is adapted to receive substantially all waste liquid, e.g. unused methanol, from the fuel reservoir of the fuel cell. Thereby, a precise amount of new fuel may be added to the fuel reservoir of the fuel cell in each refuelling operation.

The at least one evaporation opening may be configured to allow evaporation of waste liquid up to the predetermined maximum volume per time under normal operating conditions, i.e. approximately 1 atm. pressure in atmospheric air and within a temperature range of e.g. 0-50° C. It is to be understood throughout this text that this applies, where air pressure of the surroundings and temperature influence the performance of the various aspects and/or embodiments of the present invention. In some embodiments, the system may for instance be configured to allow 840 μL of methanol fuel at a 20 mol methanol solution to evaporate per day at 30% relative humidity and 20° C.

The refuelling unit may be suitable for refuelling a fuel cell of a hearing aid. Due to the small volume of fuel, e.g. less than 0.5 ml of methanol, which is contained in the fuel reservoir of the fuel cell of the hearing aid, the predetermined maximum volume per time of waste liquid allowed to evaporate may be e.g. between 0.01 ml and 15 ml per day, between 0.01 ml and 10 ml per day or between 0.01 ml and 5 ml per day. The first reservoir may hence be configured to contain a volume of fuel for a number of, such as at least 5 or at least 10 to 120, refuelling sessions, preferably 30-90 refuelling sessions. Similarly, the second reservoir may be configured to contain a similar volume of waste liquid or less, such as less than 15 ml, e.g. less than 10 ml, 5 ml or 2.5 ml. Throughout this text a refuelling session is used to describe a process in which a waste liquid is emptied from a fuel reservoir of a fuel cell and fuel subsequently is filled into the fuel reservoir of a fuel cell.

The fuel cell may have a fuel inlet and a waste outlet, each of these being fluidly connected to the fuel reservoir, and the system may refuel the fuel cell by transferring waste from the fuel reservoir of the fuel cell through the waste outlet of the fuel cell and into the second reservoir and simultaneously and/or subsequently transfer fuel from the first reservoir of the cartridge to the fuel reservoir through the fuel inlet of the fuel cell. The fuel inlet and waste outlet of the fuel cell may be one connection port which may be used as both inlet and outlet. The fuel cell may moreover have one or more fuel reservoirs, which may contain fuel. Preferably, the fuel cell is a fuel cell of a hearing aid.

Each fluid connection of the reservoirs and the in-/outlet of the fuel reservoir may be provided through e.g. a valve arrangement, a flow path, a tube or the like in the refuelling unit. The fluid connections are here and throughout this text to be understood as connections allowing for liquid, such as methanol and by-products, such as formic acid and the like, to pass through the connections.

In an embodiment of the system, the second reservoir is arranged in the cartridge or in the refuelling unit.

By the second reservoir being arranged in the cartridge or in the refuelling unit, a fluid connection may be provided between the fuel reservoir of the fuel cell and the second reservoir within the cartridge or refuelling unit, thereby allowing for a simple and secure connection between the second reservoir and the fuel reservoir of the fuel cell. The second reservoir may e.g. at an inlet thereof comprise a gasket, a valve arrangement or the like to ensure a tight fluid connection to the fuel reservoir of the fuel cell during refuelling operation.

Moreover, the at least one evaporation opening may be provided in the cartridge or in the refuelling unit. A cross-sectional area of the evaporation opening, or a total cross-sectional area of the evaporation openings, provided herein may for instance be from 10 $mm^2$ up to 2,500 $mm^2$, and preferably between 50 $mm^2$ and 1,000 $mm^2$.

In an embodiment of the system, the second reservoir further comprises a filter medium configured to accommodate the waste liquid, and the waste liquid evaporates from the filter medium.

By the filter medium being configured to accommodate the waste liquid, the filter medium may, in combination with the at least one evaporation opening, define the volume of waste liquid per time, which is allowed to evaporate from the second reservoir. Moreover, by the waste liquid evaporating from the filter medium, the at least one evaporation opening of the second reservoir may be a simple cut-out, slit, recess, or the like, thereby reducing the manufacturing complexity and costs.

The filter medium may accommodate the waste liquid e.g. by absorbing it, or by adsorbing it. Preferably, the filter medium is a foam or cloth made from an absorbing material, such as e.g. polymers, such as polyester or polyurethane, from cotton, wood fibre, cellulose, viscose, or any combination thereof. The filter medium may be interchangeable or may be fixed in the second reservoir. Preferably, the filter medium fills out the second reservoir, and most preferred the filter medium and the second reservoir also have an L-shaped cross-section. Thereby, an increased volume of accommodated waste liquid per volume of the filter medium may be achieved. Preferably, the filter medium has an evaporation area, i.e. a surface area from which the waste liquid can evaporate, of from 10 $mm^2$ to 10,000 $mm^2$, preferably from 50 $mm^2$ to 5,000 $mm^2$, preferably from 100 $mm^2$ to 2,500 $mm^2$. The evaporation area may be any area of the filter medium, from which the waste liquid can evaporate, and is thus not limited to an area of a surface of the filter medium, which contacts the evaporation opening.

The filter medium may be disposed between a waste inlet of the second reservoir and the at least one evaporation opening, thereby allowing the waste liquid from the fuel cell to be led to the filter medium and thus be accommodated in the filter medium in an easy manner.

In yet another embodiment, the system comprises a cover at least partially covering said at least one evaporation opening, and adapted to prevent a user from coming into contact with the filter medium.

By the cartridge comprising a cover, which at least partially covers the at least one evaporation opening of the second reservoir and being adapted to prevent the user from coming into contact the filter medium, the risk of the user getting skin contact with the evaporating waste liquid is reduced. Consequently, the risk of a user getting into skin contact with waste liquids which contains e.g. methanol or by-products in amounts in amounts, which may be health impairing to the user, is minimised.

The cover preferably covers the entire evaporation opening to prevent skin contact from the user with the evaporation opening and thus with the waste liquid in the second reservoir. The cover may comprise at least a section which is made from a material permeable to evaporated waste liquid, such as methanol. Alternatively, the cover may be impermeable to evaporated waste liquid and/or may comprise at least one other opening, through which the evaporated waste liquid is lead to the surroundings.

In yet another embodiment, the system further comprises a pump arrangement, said pump arrangement being adapted to transfer the waste liquid from the fuel reservoir of said fuel cell into the second reservoir and/or to transfer fuel from the first reservoir of the cartridge into the fuel reservoir of said fuel cell.

Thereby, the fuel cell may be refuelled quickly and seamlessly. Moreover, the volume of waste liquid transferred from the fuel reservoir of the fuel cell and the volume of fuel transferred to the fuel reservoir may be regulated by the pump arrangement.

The pump arrangement may comprise a valve arrangement and may be electrically controlled by a control unit. The pump arrangement may in combination therewith or alternatively utilise a pressure difference in the first and second reservoirs and the fuel reservoir of the fuel cell. The refuelling unit may comprise a power source, such as a battery, a power supply, or the like, to supply power to e.g. the pump arrangement, a control unit, or the like. The pump arrangement may, thus, form at least a part of the fluid connection between the first reservoir of the cartridge and fuel reservoir of the fuel cell and/or between the second reservoir and the fuel reservoir of the fuel cell.

In some embodiments, the system further comprises a control unit configured to control the volume of waste liquid received into the second reservoir.

Consequently, the second reservoir may not be saturated with waste liquid. This may aid in maintaining the evaporated volume per time of the waste liquid at a desired level.

The control unit may comprise a microcontroller unit (MCU), a central processing unit (PCU), a field-programmable gate array (FPGA), or the like. The control unit may moreover comprise a pump arrangement, a valve arrangement, a number of actuators, or the like. The control unit may be arranged within the refuelling unit.

In another embodiment, the control unit controls the amount of waste liquid received into the second reservoir by estimating a volume of waste liquid in the second reservoir and preventing additional refuelling of the fuel cell, if the volume of waste liquid in the second reservoir exceeds a predetermined maximum volume.

Thereby, the control unit prevents the second reservoir from being saturated with waste liquid. The predetermined maximum volume of waste liquid may depend upon a maximum allowed volume per time of waste liquid which may evaporate from the second reservoir. The predetermined maximum volume of waste liquid may correspond to the maximum allowed volume which may evaporate from the second reservoir within e.g. 2 hours, 8 hours, or 24 hours.

The control unit may determine the amount of waste liquid in the second reservoir by means of a sensor or the like in the second reservoir, or by measuring the inflow into the second reservoir from the fuel cell. It is to be understood here that any well-known sensing or measuring method and apparatus for this may be implemented, and it will therefore not be elaborated further throughout this text.

In an embodiment, the control unit estimates the volume of waste liquid in the second reservoir by determining a number of refuelling sessions of the fuel cell within a predetermined period of time, wherein a maximum storage volume of the second reservoir corresponds to a maximum number of refuelling sessions within a predetermined period of time. By measuring the number of refuelling sessions per time, the refuelling sessions may be carried out with little effort from the control unit. Moreover, indications, such as visual or audio indications may be given to the user indicating the remaining possible refuelling sessions within the predetermined period of time. In some embodiments, the control unit moreover determines the volume of fuel in the first reservoir, and the remaining possible refuelling sessions within the predetermined period of time may also depend on this determined volume.

The maximum number of refuelling sessions within a predetermined period of time may be in the range from 2 refuelling sessions per day to 20 refuelling sessions per day, preferably in the range from 4 refuelling sessions per day to 12 refuelling sessions per day.

In an embodiment, the system further includes the fuel cell having a fuel reservoir. In some embodiments, the system includes a hearing aid comprising said fuel cell.

According to a second aspect, the present invention relates to a cartridge for use in a system according to the first aspect comprising:
  a first reservoir adapted to store a liquid fuel for a fuel cell, and
  a second reservoir for storing a waste liquid from the fuel reservoir of the fuel cell, characterised in that the second reservoir comprises at least one evaporation opening connected to the surroundings, and adapted to allow the waste liquid to evaporate from the second reservoir to the surroundings.

By the cartridge comprising a second reservoir for storing a waste liquid, which again comprises at least one evaporation opening, as described with respect to the first aspect of the invention, the waste liquid is allowed to evaporate and the need for long-term storage of the waste liquid may be avoided. By the cartridge moreover comprising the first and the second reservoir and thus storing both the fuel and the waste liquid, the other components of a refuelling system may be manufactured to be less air and/or liquid tight, thereby allowing for reduced manufacturing costs of the system. The cartridge may furthermore be replaced, when the first reservoir for fuel is empty, or when the second reservoir for waste liquid is full, thereby allowing for further refuelling sessions per day.

The cartridge may, in use, be removably connected to a refuelling unit, be received within the refuelling unit or be attached to the refuelling unit, such that it may be removed from the refuelling unit.

The cartridge is preferably designed to contain a given volume of fuel in the first reservoir. By allowing the waste liquid to evaporate, the second reservoir may be small in volume relative to the first reservoir, as the waste liquid is not accumulated in the second reservoir. This, in turn, allows this given volume of fuel to be stored in a smaller cartridge, thereby allowing for a compact cartridge. The volume of the first and second reservoirs may be fixed, and the reservoirs may be separated by a wall, a membrane, a gasket, or the like.

In a preferred embodiment, the cover and the body of the cartridge form a ventilation opening between the cover and the body of the cartridge so as to allow evaporated waste liquid to escape from the second reservoir through said ventilation opening.

In an embodiment of the cartridge, the second reservoir further comprises a filter medium configured to accommodate the waste liquid from the fuel cell, and wherein the waste liquid evaporates from said filter medium.

As described with respect to the first aspect of the invention, the filter medium of the second reservoir of the cartridge may aid in controlling the evaporated volume of waste liquid per time, as well as provide for the evaporation opening to be simple to manufacture by allowing this to be e.g. a simple cut-out, slit, recess, or the like. The filter medium may be a foam, a cloth, or another absorbing material to accommodate to waste liquid by absorbing this. By the second reservoir of the cartridge comprising the filter medium, the cartridge and thus filter medium may be replaced e.g. if the absorbency of the filter medium is reduced or altered with time due to use and/or wear and tear, or the like. This, again, allows for a uniform absorbency and/or evaporation of the waste liquid per time.

According to a third aspect, the present invention relates to a refuelling unit for use in a system according to the first aspect of the invention, said refuelling unit comprising
  a cartridge receiving section configured to receive a cartridge having a first reservoir configured to store a liquid fuel for a fuel cell,
said refuelling unit being adapted to provide fuel from the first reservoir of the cartridge to the fuel reservoir of the fuel cell, characterised in that the refuelling unit is further adapted to transfer a waste liquid from a fuel reservoir of the fuel cell into a second reservoir, the second reservoir comprising at least one evaporation opening connected to the surroundings, and adapted to allow the waste liquid to evaporate from the second reservoir to the surroundings.

Thereby a fast and easy refuelling of a fuel cell connected to the refuelling unit may be achieved whilst allowing the waste liquid from the fuel cell to evaporate from the second reservoir and, thus, reducing the need for handling potentially health-impairing waste liquid.

The cartridge receiving section may comprise one or more valves and/or gaskets or the like, through which one or more reservoirs of the cartridge may be connected to prevent leakage or undesired flow of fuel and/or waste liquid. Similarly, valves, gaskets, membranes or the like may be used at the connection between the refuelling unit and the fuel cell.

The refuelling unit may be configured to receive the cartridge in an interchangeable manner, thereby allowing for the cartridge to be replaced, e.g. when out of fuel in the first reservoir, thus allowing for the refuelling unit being used for many refuelling sessions of a fuel cell.

The cartridge may be fixed to the refuelling unit by means of e.g. clips, clamps, or the like, or e.g. by means of a lid, which holds the cartridge in place in the refuelling unit. Preferably, the refuelling unit accommodates the cartridge. Alternatively, the cartridge may be arranged adjacent to the refuelling unit or separate from the refuelling unit and connected thereto.

In another embodiment of the refuelling unit, the second reservoir is arranged in the refuelling unit.

By the second reservoir being arranged in the refuelling unit, a fluid connection between the fuel reservoir of the fuel cell and the second reservoir may be established within the refuelling unit during refuelling, thus reducing manufacturing complexity whilst allowing for a simple and secure connection. Moreover, by providing the second reservoir within the refuelling unit, the other components of a refuelling system may be manufactured less air and/or liquid tight, thus allowing for reduced manufacturing complexity and/or costs.

The evaporation opening may be arranged in e.g. a side wall, a top wall or a bottom wall of the refuelling unit.

The refuelling unit further may moreover comprise a cover, which at least partially covers the evaporation opening of said cartridge in a mounted condition. The cover at least partially covering the evaporation opening of the cartridge in the mounted condition, may prevent skin contact of the user with a waste liquid in the second reservoir.

The cover of the refuelling unit may be provided in combination with a cover of the cartridge. The cover of the refuelling unit may comprise openings, slits, or the like to allow passage of the evaporated waste liquid to the surroundings. Alternatively, or in combination therewith, passage of the evaporated waste liquid to the surroundings may be provided by the cover comprising at least a section made from a permeable material.

In an embodiment of the cartridge, the second reservoir further comprises a filter medium configured to accommodate the waste liquid from the fuel cell, and wherein the waste liquid evaporates from said filter medium.

As described with respect to the first and second aspects of the invention, the filter medium of the second reservoir of the cartridge may aid in controlling the evaporated volume of waste liquid per time, as well as provide for the evaporation opening to be simple to manufacture by allowing this to be e.g. a simple cut-out, slit, recess, or the like. The filter medium may be a foam, a cloth, or another absorbing material for accommodating the waste liquid by absorbing this.

According to a fourth aspect, the present invention relates to a method of refuelling a fuel cell having a fuel reservoir, comprising the steps of:

providing a system according to the first aspect of the invention, fluidly connecting the fuel reservoir of the fuel cell to the first and second reservoirs of the system, transferring to the second reservoir, waste liquid from the fuel reservoir of the fuel cell, transferring to the fuel reservoir of the fuel cell, fuel from the first reservoir of the cartridge, evaporating waste fluid to the surroundings from said second reservoir through the at least one evaporation opening.

Consequently, a method of refuelling a fuel cell in an easy manner without having stored waste liquids, which must be handled and disposed of separately is provided. As described with respect to the first aspect of the invention, the fuel cell is preferably a fuel cell of a hearing aid and may comprise additional reservoirs and one or more connection ports. In some embodiments, the step of evaporating waste liquid to the surroundings may comprise evaporating substantially all the waste liquid, thereby allowing for one or more additional refuelling sessions. The second reservoir may be arranged in the cartridge or in the refuelling unit.

In another embodiment, the method further comprising the steps of:

estimating a present volume of waste liquid in the second reservoir, preventing, if the determined present volume of waste liquid in the second reservoir exceeds a predetermined maximum volume, another refuelling session.

By determining a present volume of waste liquid in the second reservoir, a saturation of the second reservoir may be prevented. The steps of determining the present volume and preventing another refuelling session is preferably carried out by a control unit, e.g. arranged in the refuelling unit. The step of determining the present volume may for instance be carried out by sensing the volume, pressure, inflow of waste liquid, or the like, in the second reservoir. Alternatively, the number of refuelling sessions may be measured. Another refuelling session may be prevented by controlling a valve arrangement, pump arrangement, an actuator, or the like to prevent transferral of fuel to the fuel cell and waste liquid from the fuel cell.

In yet another embodiment of the method, a pump arrangement is used for transferring to the second reservoir, waste liquid from the fuel reservoir of the fuel cell and/or for transferring to the fuel reservoir of the fuel cell, fuel from the first reservoir of the fuel cell.

Thereby, a quick and easy refuelling session is provided for. In some embodiments, the pump may assist in determining a present volume of waste liquid in the second reservoir. The pump may instead or in addition thereto be controlled to prevent another refuelling session if the determined present volume exceeds a predetermined maximum volume. The pump arrangement may be controlled by a control unit of the refuelling unit. The transfer of waste liquid from the fuel reservoir of the fuel cell and the transfer of fuel to the reservoir of the fuel cell may take place via a waste outlet and a fuel inlet, respectively, of the fuel cell.

The different aspects of the present invention can be implemented in different ways including as a system for refuelling a fuel cell, a cartridge for use with the system, a refuelling unit for use with the system, and a method of refuelling a fuel cell as described above and in the following, each yielding one or more benefits and advantages described in connection with at least one of the aspects described above, and each having one or more preferred embodiments corresponding to the preferred embodiments described in connection with at least one of the aspects described above. Furthermore, it will be appreciated that embodiments described in connection with one of the aspects described herein may equally be applied to the other aspects.

BRIEF DESCRIPTION OF THE DRAWINGS

The above and/or additional objects, features, and advantages of the present invention will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
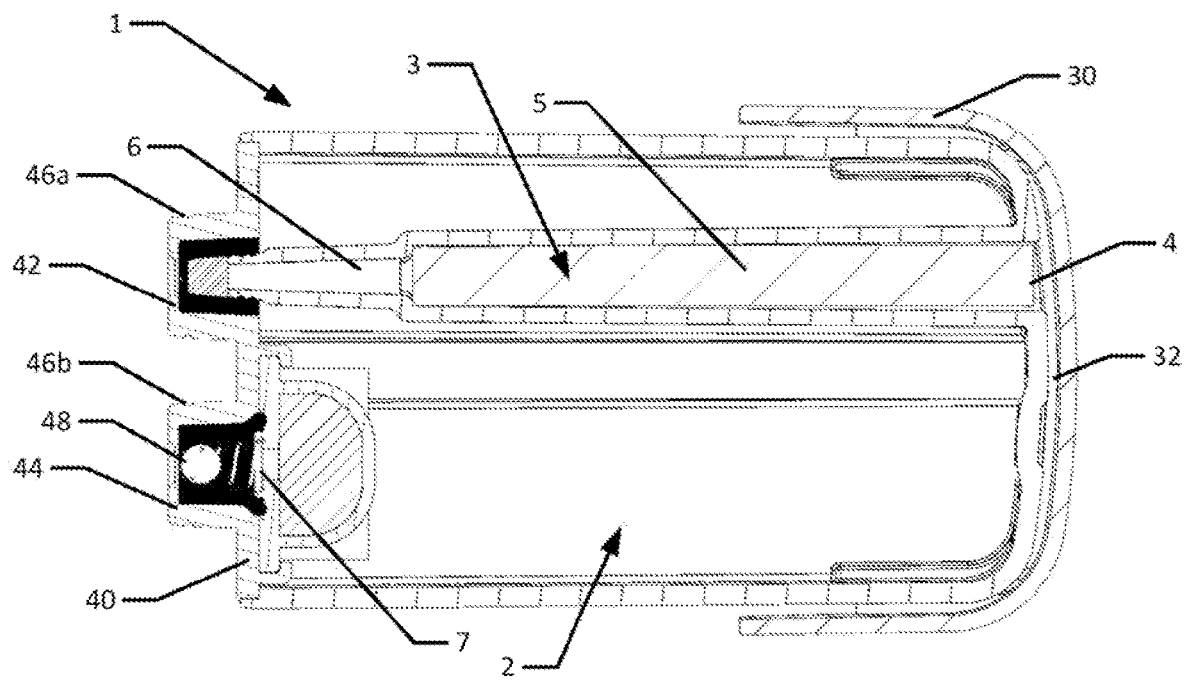
FIG. 1 shows a cross-sectional view of a cartridge according to an embodiment of the present invention.

FIG. 1 shows a cross-sectional view of a cartridge 1 according to an embodiment of the present invention. The cartridge 1 comprises a first chamber 2 for storing fuel, such as liquid methanol, for a fuel cell, having a fuel outlet 7, and a second chamber 3 for storing waste liquid from a fuel cell. The second chamber 3 comprises an evaporation opening 4, through which liquid waste evaporate to the surroundings, a waste inlet 6, and a filter medium 5 arranged between the waste inlet 6 and the evaporation opening 4. The filter medium 5 can accommodate the waste liquid by absorbing it and, in combination with the evaporation opening 4 allow it to evaporate to the surroundings in a controlled manner.

The cartridge 1 is preferably made from a rigid polymer, such as high-density polyethylene (HPDE), acrylonitrile butadiene styrene (ABS), poly-vinyl chloride (PVC), polyurethane (PUR), or the like. The material of the cartridge 1 is preferably tight and resistant to the liquid fuel and/or waste, or it may alternatively be coated with a resisting layer or provided with film on the parts of the cartridge 1, which are in contact with fuel and/or waste.

Figure 2:
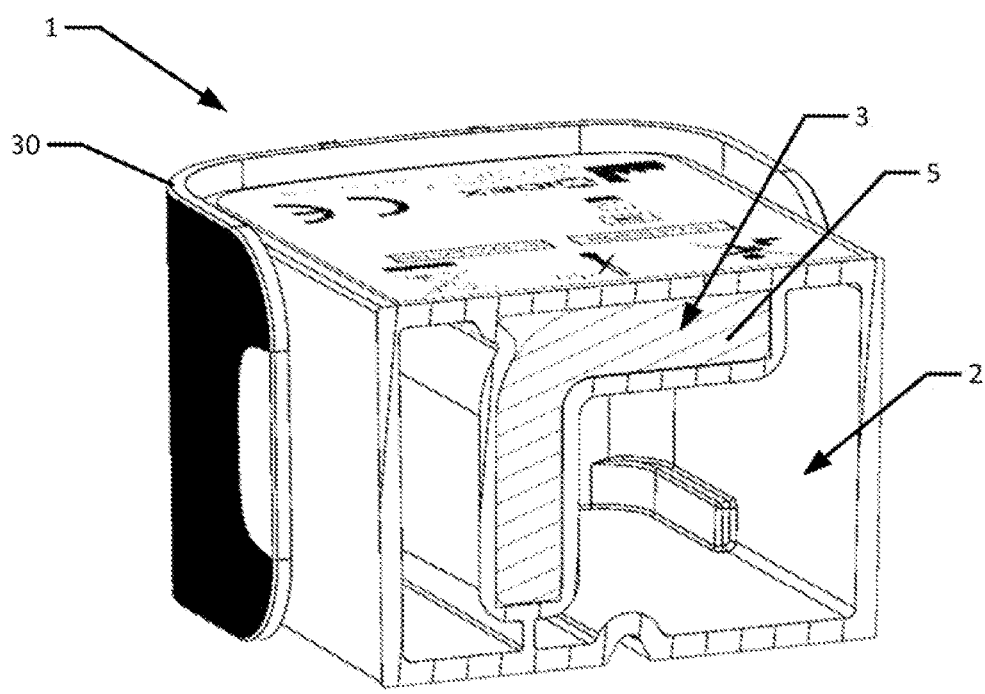
FIG. 2 shows a perspective view of the cartridge of FIG. 1 in another cross-section.

The second chamber 3 has, as seen in FIGS. 1 and 2 showing a perspective view of the cartridge 1 of FIG. 1, a smaller volume than the first chamber 2. The volume of the second chamber 3 preferably corresponds to a multiple of the volume of a fuel reservoir of a fuel cell, e.g. of a hearing aid, to be refilled by a refuelling unit comprising the cartridge 1. Similarly, the first chamber 2 preferably has a volume corresponding to a larger multiple of the volume of the fuel reservoir of the fuel cell. In another embodiment, the two chambers 2, 3 may have the same volume, or the second chamber 3 may be larger in volume than the first chamber 2.

As seen in FIGS. 1 and 2, the filter medium 5 is arranged along the entire length of the second chamber 3 and has the substantially same volume as the inner volume of the second chamber 3. In another embodiment, the filter medium 5 may be arranged in only a part of the second chamber 3, and/or may also be arranged in at least a part of the waste inlet 6. The filter medium 5 is made from a fibre material or a porous foam, allowing waste liquid comprising methanol to evaporate by means of capillary forces. In another embodiment, other fibre materials, polymers, or any combination thereof may be used for the filter medium 5. The filter medium 5 may accommodate a volume of waste liquid comprising methanol and/or by-products. The accommodated volume of the filter medium 5 preferably corresponds to a multiple of a volume of a fuel reservoir of a fuel cell of a hearing aid, and is preferably in the range from 0.1 ml to 10 ml, more preferred in the range from 0.5 ml to 5 ml and most preferred in the range from 1 ml to 3 ml.

The second chamber 3 and the filter medium 5 have, as shown in FIG. 2, a substantially L-shaped cross-sectional area. In another embodiment, the cross-section of the second chamber 3 and filter medium 5 may have a different shape, such as circular, rectangular, elliptical, or the like. A rectangular shape may however need a larger volume of filter medium 5 to accommodate the same volume of waste as the L-shaped filter medium 5 shown in FIG. 2.

Figure 3:
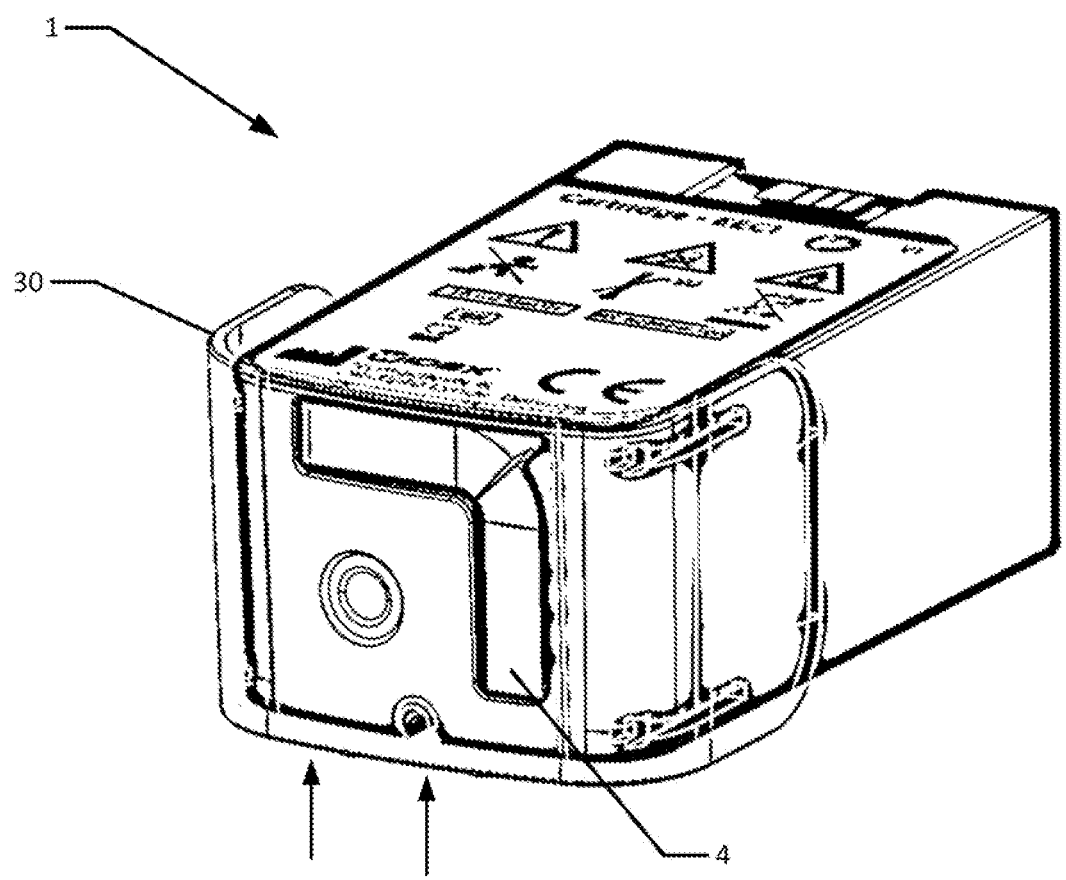
FIG. 3 shows a perspective view of the cartridge of FIGS. 1 and 2 from another angle.

The evaporation opening 4 has, as shown in FIG. 3 showing a perspective view of the cartridge 1 of FIGS. 1 and 2 from another angle, the same cross-section and cross-sectional area as the second chamber 3. In another embodiment, the cross-section of the evaporation opening 4 may have a different shape than the one of the second chamber 3 and/or the cross-sectional area may be different from the one of the second chamber 3.

The cartridge 1 moreover comprises a cover 30 as shown in FIGS. 1-3 (transparent in FIG. 3), which is arranged such that it covers the evaporation opening 4 of the second chamber 3, such that a user may not have skin contact with the evaporation opening 4 and consequently with the waste liquid. The cover 30 extends along a part of the cartridge and forms, in combination with the body of the cartridge 1, a ventilation opening 32. The ventilation opening 32 allows for a flow of air from the surroundings e.g. in a direction indicated by the arrows in FIG. 3.

Figures 4A, 4B:
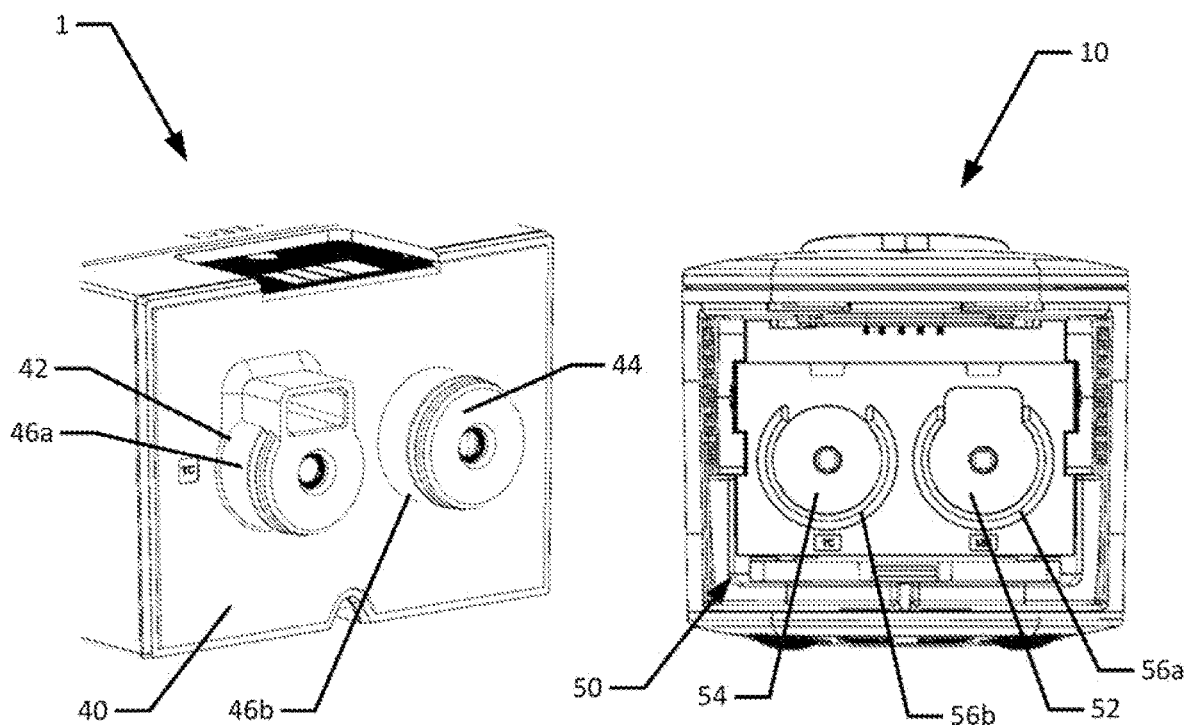
FIG. 4a shows a perspective view of an end part of the cartridge of FIGS. 1-3 from yet another angle.
FIG. 4b shows a side view of a refuelling unit according to an embodiment of the present invention, showing a cartridge receiving section of the refuelling unit.

The cartridge 1 further comprises a valve plate 40, as seen in FIG. 1 and FIG. 4a, showing a perspective view of the cartridge of FIGS. 1-3 from yet another angle. The valve plate 40 may be formed integrally with the body of the cartridge 1, or it may be fixed thereto e.g. by means of adhesion, welding, seaming, or the like.

The valve plate 40 comprises a waste inlet port 42 and a fuel outlet port 44 having a ball valve arrangement 48. The waste inlet port 42 allows a flow of waste liquid into the waste inlet 6 of the second chamber 3 of the cartridge 1. In a similar manner, the fuel outlet port 44 allows, through the ball valve arrangement 48, an outflow of fuel from the first chamber 2, when the ball valve arrangement 48 is in an open state. In another embodiment, another valve arrangement, such as a diaphragm valve, a gate valve, a plug valve, a choke valve, or the like, may be used of instead of, or in combination with, the ball valve arrangement 48. In yet another embodiment, the waste inlet port may have a valve arrangement similar to or of another type than the ball valve arrangement 48 of the fuel outlet port 44. A valve arrangement may furthermore be arranged in the first 2 and/or second chamber 3 of the cartridge in combination with or instead of a valve arrangement of the valve plate. The waste inlet port 42 and fuel outlet port 44 each have a snap groove 46a, 46b, respectively, to form a rigid and stable fluid connection between each chamber 2, 3 of the cartridge 1 and a refuelling unit.

As shown in FIG. 4b, showing a side view of a refuelling unit 10 according to an embodiment of the present invention, the refuelling unit 10 comprises a receiving section 50 comprising a cartridge inlet receiving port 52 and a cartridge outlet receiving port 54 each having a spring clip 56a, 56b, respectively. The spring clips 56a, 56b extend, as shown in FIG. 4b, in the shape of a circular arc. The spring clips 56a, 56b, are, preferably, bendable upon insertion of a cartridge 1, yet sufficiently rigid to maintain the circular arc shape when in an unmounted condition, as shown in FIG. 4b. The spring clips 56a, 56b may, thus, be made from a metal, such as a steel alloy, a brass alloy, carbon steel, or the like, or from a polymer.

Figure 4C:
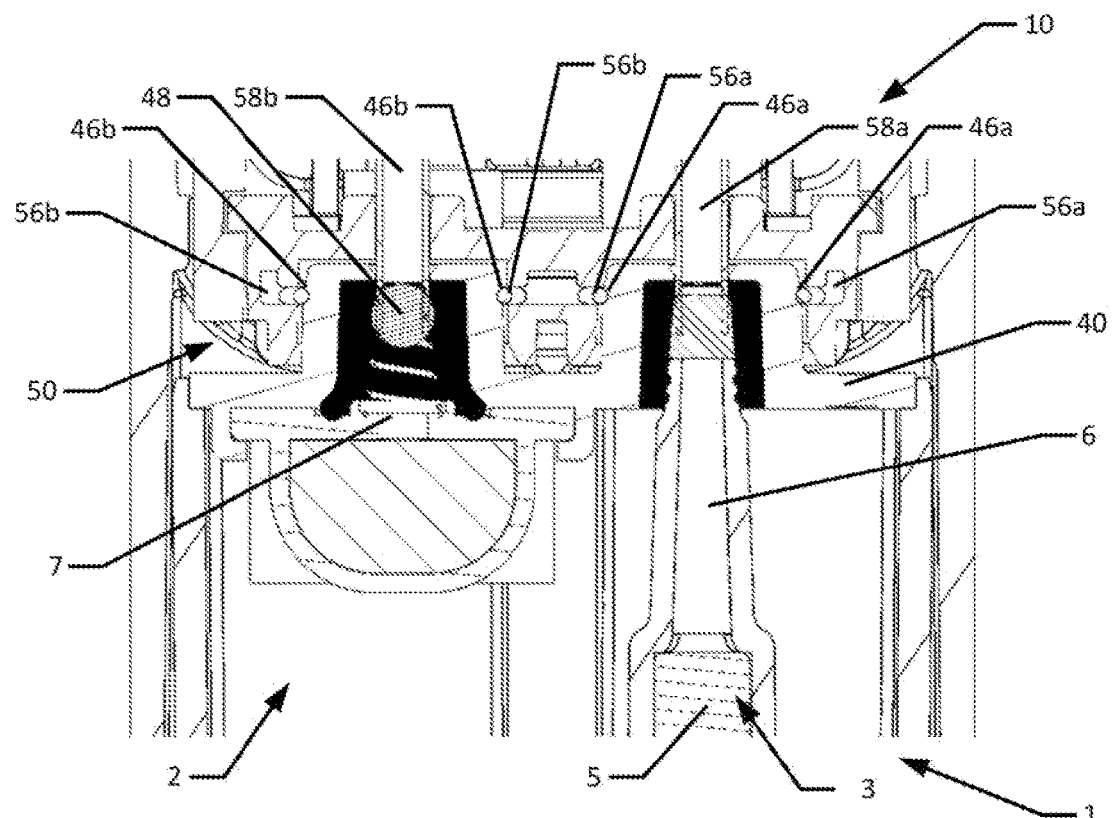
FIG. 4c shows a cross-sectional view of the interface between the cartridge of FIG. 4a and the refuelling unit of FIG. 4b, when the cartridge is in a mounted condition.

FIG. 4c shows a different cross-sectional view of the interface between the cartridge 1 of FIG. 4a and the refuelling unit 10 of FIG. 4b, when the cartridge is in a mounted condition. As seen in FIG. 4c, the spring clips 56a, 56b of the cartridge receiving section 50, engage with the snap grooves 46a, 46b of the valve plate 40, shown in FIG. 4a, when the cartridge 1 is in a mounted condition. In another embodiment, other means of connecting, such as snap connecting, the cartridge 1 and the refuelling unit 10 may be used. For example, the cartridge 1 may comprise a bending section in the body thereof, and the refuelling unit 10 may comprise a recess to engage therewith. Any other known snap-connecting means may similarly be used instead of or in combination with the snap grooves 46a, 46b and spring clips 56a, 56b.

As seen in FIG. 4c, the receiving section 50 of the refuelling unit 10 may activate the ball valve arrangement 48, thus allowing for a fluid connection between the refuelling unit 10 and the cartridge 1. Such a fluid connection between the refuelling unit 10 and the first 2 and second chamber 3 of the cartridge 1 is provided by canals 58b and 58a, respectively. The canals 58a, 58b are formed in the body of the refuelling unit 10 and may be made from any material capable of containing liquid fuel, such as methanol, and waste liquid. In another embodiment, tubes, pipes, or the like form the fluid connections instead of or in combination with the canals 58a, 58b. Preferably, the canals 58a, 58b provide a liquid connection to a pump unit (not shown) of the refuelling unit 10, which aids or facilitates transportation of liquid fuel from the first chamber 2 of the cartridge 1 through the canal 58b and to a fuel reservoir of a fuel cell, connected to the refuelling unit 10. In a preferred embodiment of the refuelling unit 10, the same or another pump unit (not shown) aids or facilitates a transfer of liquid waste from the fuel cell through the canal 58a and into the second chamber 3 of the cartridge.

The refuelling unit 10 may have sides, a top and/or a bottom extending along the sides of the cartridge 1 to fully or partially enclose it in the refuelling unit 10. For instance, the sides of the refuelling unit 10 may extend to reach the cover 30 of the cartridge 1. In some embodiments, the cover 30 of the cartridge 1 may, thus, be fixed to the refuelling unit 10 instead of or in combination with fixing it to the cartridge 1.

Figure 5:
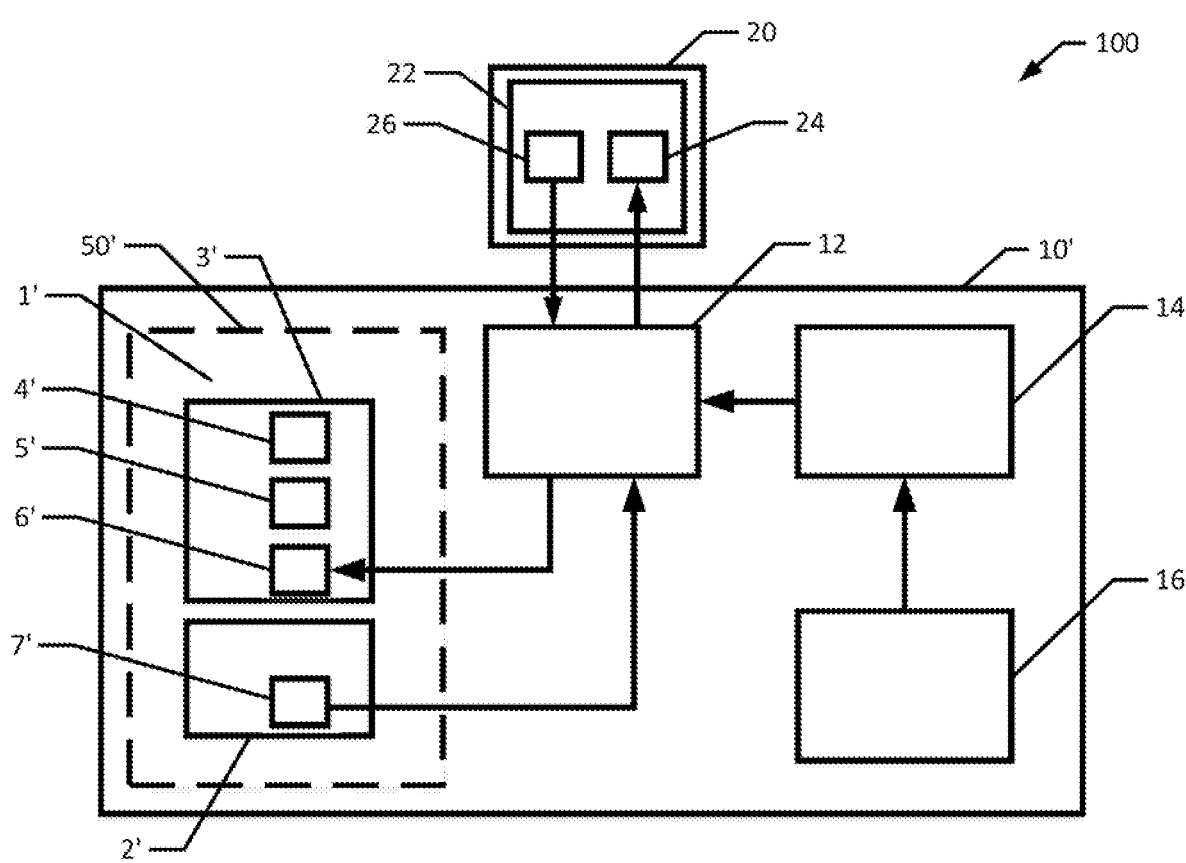
FIG. 5 shows a schematic drawing of a system for refuelling a fuel cell, according to an embodiment of the present invention.

FIG. 5 shows a schematic drawing of a system 100 for refuelling a fuel cell 20, according to an embodiment of the present invention. The system 100 comprises a refuelling unit 10' comprising a cartridge receiving section 50', in which a cartridge 1' is arranged. The refuelling unit 10' moreover comprises a pump unit 12, a control unit 14 controlling the pump unit 12, and a battery 16 powering the control unit 14. The battery 16 may e.g. be one or more alkaline, Lithium-ion (Li-ion) or NiMH batteries of standard size, such as AA, AAA, or the like, or it may be a custom-sized battery, such as a Lithium-polymer (LiPo) battery. In another embodiment, the refuelling unit comprises a power supply for running on a DC or an AC voltage to supply the control unit 14 and/or pump unit 12 in combination with or instead of the battery 16.

As seen in FIG. 5, the cartridge 1' is surrounded by the cartridge receiving section 50' and consequently by the refuelling unit 10'. In another embodiment, the cartridge 1' may be partially surrounded by, be arranged adjacent to, or be arranged distal from the cartridge receiving section 50' of the refuelling unit 10'. The cartridge receiving section 50' may furthermore comprise a number of connecting means (not shown), such as clips, screws, or the like, for connecting the cartridge 1' to the refuelling unit 10' and/or keeping it in place.

The cartridge 1' comprises a first chamber 2' having a fuel outlet 7', which is fluidly connected to the pump unit 12 of the refuelling unit 10', allowing liquid fuel to flow from the first chamber 2' to the pump unit 12. The cartridge moreover comprises a second chamber 3' comprising an evaporation opening 4', through which waste liquid can evaporate to the surroundings, as well as a filter medium 5' and a waste inlet 6', fluidly connected to the pump unit 12. The fluid connection between the waste inlet 6' and the pump unit 12 allows waste liquid to flow from the pump unit 12, to the second chamber 3' of the cartridge 1'.

The fuel cell 20, e.g. of a hearing aid, comprises a fuel reservoir 22 having a fuel inlet 24 and a waste outlet 26. When the fuel cell 20 is connected to the refuelling unit 10' to carry out a refuelling session, the waste outlet 26 and the fuel inlet 24 of the fuel cell 20 are, as shown in FIG. 5, in fluid connection with the pump unit 12. Thus, the pump unit 12 may transfer waste liquid from the fuel reservoir 22 into the second chamber 3' of the cartridge 1' and, preferably subsequently, transfer liquid fuel from the first chamber 2' of the cartridge 1' into the fuel reservoir 22 of the fuel cell 20. The pump unit 12 may be any known type of pump unit, such as electro-mechanical pumps comprising pistons, or a manually operated pump unit.

The control unit 14 controls and supplies power to the pump unit 12 and, preferably simultaneously, determines the volume of waste liquid transferred by the pump unit 12 from the fuel reservoir 22 of the fuel cell 20 into the second chamber 3' of the cartridge 1'. If more than a predetermined maximum volume of waste liquid has been transferred from a fuel cell 20 to the cartridge 1' within a predetermined amount of time, the control unit 14 prevents additional refuelling for a period of time. The control unit 14 preferably determines the volume of waste liquid by counting the number of refuelling sessions within the period of time. The predetermined maximum volume of waste liquid per time may similarly be measured in refuelling sessions within a period of time and may depend on the volume of the second chamber 3', the evaporation capabilities of the evaporation opening 4', and the filter medium 5'.

Although some embodiments have been described and shown in detail, the invention is not restricted to them, but may also be embodied in other ways within the scope of the subject matter defined in the following claims. In particular, it is to be understood that other embodiments may be utilised and structural as well as functional modifications may be made with-out departing from the scope of the present invention. It should furthermore be emphasised that the term "comprises"/"comprising" when used in this specification is taken to specify the presence of stated features, integers, steps, or components but not preclude the presence or addition of one or more features, integers, steps, components, or groups thereof.

The invention claimed is:

1. A system for refuelling a fuel cell, the system comprising
   a cartridge having a first reservoir for storing fuel;
   a refuelling unit adapted to receive a waste liquid from a fuel reservoir of the fuel cell and provide fuel from the first reservoir of the cartridge to the fuel reservoir of the fuel cell;
      wherein the system further comprises a second reservoir for storing the waste liquid from the fuel cell, wherein the second reservoir comprises at least one evaporation opening connected to the surroundings, and is adapted to allow the waste liquid to evaporate from the second reservoir to the surroundings, and wherein the second reservoir further comprises a filter medium configured to absorb the waste liquid, and wherein the waste liquid evaporates from the filter medium; and a cover at least partly covering the evaporation opening, and adapted to prevent a user from coming into contact with the filter medium.

2. The system according to claim 1, wherein the second reservoir is arranged in the cartridge or in the refuelling unit.

3. The system according to claim 1 further comprising a pump arrangement, said pump arrangement being adapted to transfer the waste liquid from the fuel reservoir of said fuel cell into the second reservoir and/or to transfer fuel from the first reservoir of the cartridge into the fuel reservoir of said fuel cell.

4. The system according to claim 1 further comprising a control unit configured to control a volume of waste liquid received into the second reservoir.

5. The system according to claim 4, wherein the control unit controls an amount of waste liquid received into the second reservoir by estimating the volume of waste liquid in the second reservoir and preventing additional refuelling of the fuel cell, if the volume of waste liquid in the second reservoir exceeds a predetermined maximum volume.

6. A cartridge for use in a system for refuelling a fuel cell, comprising
    a first reservoir adapted to store a liquid fuel, and
    a second reservoir for storing a waste liquid from a fuel reservoir of the fuel cell,
    wherein the second reservoir comprises at least one evaporation opening connected to the surroundings, and is adapted to allow the waste liquid to evaporate from the second reservoir to the surroundings
    wherein the second reservoir further comprises a filter medium configured to absorb the waste liquid, and wherein the waste liquid evaporates from the filter medium, and
    wherein the at least one evaporation opening is at least partly covered to prevent a user from coming into contact with the filter medium.

7. A refuelling unit for use in a system for refuelling a fuel cell, comprising
    a cartridge receiving section configured to receive a cartridge having a first reservoir configured to store a liquid fuel,
    said refuelling unit being adapted to provide fuel from the first reservoir of the cartridge to a fuel reservoir of the fuel cell, characterised in that the refuelling unit is further adapted to transfer a waste liquid from a fuel reservoir of the fuel cell into a second reservoir, the second reservoir comprising at least one evaporation opening connected to the surroundings, and adapted to allow the waste liquid to evaporate from the second reservoir to the surroundings
    wherein the second reservoir further comprises a filter medium configured to absorb the waste liquid, and wherein the waste liquid evaporates from the filter medium, and
    wherein the at least one evaporation opening is at least partly covered to prevent a user from coming into contact with the filter medium.

8. The refuelling unit according to claim 7, wherein the second reservoir is arranged in the refuelling unit.

9. A method of refuelling a fuel cell having a fuel reservoir, comprising the steps of:
    providing the system according to claim 1,
    fluidly connecting the fuel reservoir of the fuel cell to the first and second reservoirs of the system,
    transferring to the second reservoir, waste liquid from the fuel reservoir of the fuel cell,
    transferring to the fuel reservoir of the fuel cell, fuel from the first reservoir of the cartridge,
    evaporating waste liquid to the surroundings from said second reservoir through the at least one evaporation opening.

10. The method according to claim 9 further comprising the steps of:
    estimating a present volume of waste liquid in the second reservoir,
    preventing, if the determined present volume of waste liquid in the second reservoir exceeds a predetermined maximum volume, another refuelling session.

11. The method according to claim 9, wherein a pump arrangement is used for transferring to the second reservoir, waste liquid from the fuel reservoir of the fuel cell and/or for transferring to the fuel reservoir of the fuel cell, fuel from the first reservoir of the fuel cell.

* * * * *